Figure 1:
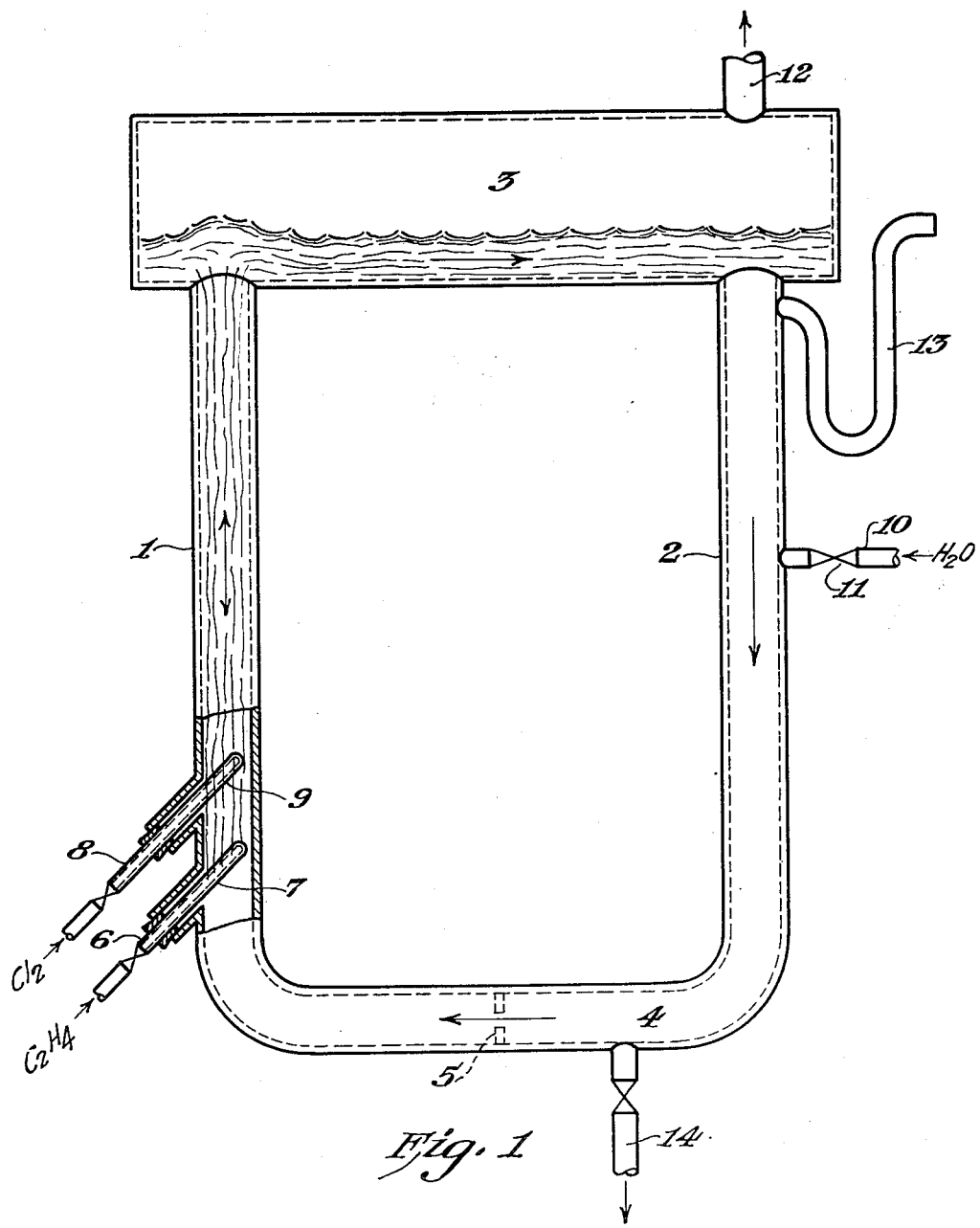

Sept. 13, 1938.  E. C. BRITTON ET AL  2,130,226
MANUFACTURE OF OLEFINE CHLOROHYDRINS
Filed July 27, 1936   2 Sheets-Sheet 1

INVENTORS
Edgar C. Britton
Howard S. Nutting
BY Myron E. Huscher
Thomas Griswold Jr. & E.C. Burdick.
ATTORNEYS Sept. 13, 1938.  E. C. BRITTON ET AL  2,130,226
MANUFACTURE OF OLEFINE CHLOROHYDRINS
Filed July 27, 1936  2 Sheets-Sheet 2

INVENTORS
Edgar C. Britton
Howard S. Nutting
Myron E. Huscher
BY
Thomas Griswold Jr. + E. C. Burdick
ATTORNEYS Patented Sept. 13, 1938

2,130,226

UNITED STATES PATENT OFFICE 2,130,226

MANUFACTURE OF OLEFINE CHLOROHYDRINS

Edgar C. Britton, Howard S. Nutting, and Myron E. Huscher, Midland, Mich., assignors to The Dow Chemical Company, Midland, Mich., a corporation of Michigan Application July 27, 1936, Serial No. 92,768

11 Claims. (Cl. 260—634)

This invention concerns an improved method and apparatus for manufacturing olefine chlorohydrins and dihalo-alkyl ethers, which compounds have the general formula.

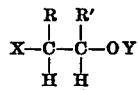

wherein R and R' each represent hydrogen or a lower alkyl group, X represents halogen, and Y represents hydrogen or the radical

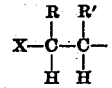

It particularly concerns improvements in the manufacture of ethylene chlorohydrin, by reacting ethylene with chlorine and water, in which the ethylene and chlorine may be mixed with inert diluent gases.

A number of methods and various forms of apparatus for manufacturing ethylene chlorohydrin from pure ethylene, pure chlorine, and water are known, but only a few methods adapted to the employment of ethylene in dilute form have been suggested. Of the latter, each involves disadvantageous features such as the employment of high reaction temperatures, or of a large excess of ethylene, or a batch mode of operation involving repeated rehandling of the gaseous reactant, or the use of mechanical pumps in handling the strongly acid and highly corrosive reaction liquor, etc. Insofar as we are aware, no method wherein dilute chlorine is employed as a reactant has been disclosed.

Since dilute ethylene, e. g. a mixture of ethylene, hydrogen and saturated hydrocarbons obtained from cracked-oil gas, and dilute chlorine, e. g. a mixture of chlorine and air, are obtainable in large quantities and at much lower cost than the pure gases, a simple and economical method for employing such dilute gases in the manufacture of ethylene chlorohydrin is to be desired. An object of the present invention is to provide a simple and efficient method of manufacturing an olefine halohydrin, e. g. ethylene chlorohydrin, from an olefine, a halogen, and water wherein the olefine and/or halogen may be employed in dilute or concentrated form, as desired, as well as apparatus which may be employed in practicing the method. Other objects will be apparent from the following description of the invention.

We have found that an olefine halohydrin may be produced in good yield from water, a halogen, and a dilute or concentrated olefine without necessity of employing an excess of the olefine or recycling the same, by introducing and dispersing the halogen and olefine into the lower part of a column of water of substantial height maintained at a temperature below 90° C., preferably not exceeding 80° C., so that the time required for the gases to rise through the liquid column is sufficient for the reaction to go substantially to completion. The halogen and olefine-containing gas may be introduced together into the water, e. g. simultaneously and through a common inlet, but they are preferably introduced separately through individual inlets, since the formation of olefine halide as by-product is thereby reduced. By introducing said reactants separately under the conditions just stated, we find that the halogen and olefine-containing gas form individual bubbles in the water which remain substantially distinct from one another, even though means be employed for breaking the bubbles initially formed into smaller bubbles. However, if higher reaction temperatures are employed or if the gases are not completely immersed in the liquid until completion of the reaction, the halogen and olefine become mixed and direct halogenation of the olefine occurs with resultant increased formation of by-products such as ethylene chloride, trichloroethane, tetrachloroethane, etc.

We have further found that the reaction may be carried out continuously in cyclic manner without employing pumps or other mechanical devices to circulate the corrosive liquor, when means are provided for a return flow of the liquor from the top of the aforesaid water column to the bottom thereof. The levitating effect of the gas bubbles in the liquid column causes an upward flow of liquid therein which, if allowed to overflow at the top and return through a suitable pipe or duct to the bottom of the column, sets up a continuously circulating flow of liquid in the system. A chamber of sufficient size is provided at the top of the reaction column to permit the disengagement of inert diluent gases, which are vented from the system. When a sufficient concentration of product has accumulated in the liquid body, a certain portion thereof may be continuously withdrawn and fresh water added to maintain a constant volume, whereupon the reaction is continued at substantially uniform product concentration.

The annexed drawings illustrate diagrammatically two forms of apparatus which may be employed in practicing the invention. The apparatus shown in Figure 1 may be employed when using a fairly concentrated halogen, e. g. chlorine containing not more than 15 per cent of air by volume, the olefine being of any desired concentration. The apparatus shown in Figure 2 may be employed regardless of the concentrations of the halogen and olefine. It is particularly advantageous when using a halogen in very dilute form, e. g. chlorine containing more than 15 per cent of air.

In Figure 1 numerals 1 and 2 designate vertical columns, communicating at the top through a header chamber 3, and connected at the bottom by a conduit 4, in which is a gate or constriction 5 to restrict the flow of liquid therethrough. Header 3 serves as a passage through which liquid may flow from column 1 to column 2, and also as a separating chamber for disengagement of diluent gases from the liquid, which are carried away through a vent 12. Near the bottom of column 1 are gas inlets 6 and 8 which are provided with porous thimbles 7 and 9, respectively, said thimbles projecting into column 1 and serving to disperse the gases in the liquid in said column in the form of small bubbles. In column 2 is a water inlet 10 fitted with valve 11, and a trapped overflow outlet 13, while at the bottom in conduit 4 is a valved drain 14. Inlets 6, 8 and 10 and gas vent 12 may be made of usual structural materials such as iron or steel, and the thimbles 7 and 9 of unglazed porcelain, alundum, silicon carbide, or other porous material resistant to acids. All other parts of the apparatus are preferably made of, or lined with, acid-resistant material such as glass, porcelain enamel, glazed tile, tantalum, etc.

In manufacturing ethylene chlorohydrin from cracked-oil gas, chlorine, and water, using apparatus similar to that described above, the oil gas is given a preliminary treatment for the removal of olefines higher than ethylene. Such treatment may consist in treating the gas with sufficient chlorine to react with the olefines higher than ethylene and separating the chlorinated products, or in scrubbing the gas with sulphuric acid of such concentration and at such temperature that olefines higher than ethylene are selectively absorbed leaving the ethylene substantially unreacted. Other chemical and physical methods for removing olefines higher than ethylene from cracked-oil gas known to the art may also be used. The gas remaining after such treatment consists substantially of a mixture of ethylene, hydrogen, and saturated hydrocarbons such as methane, ethane, propane, butanes, etc.

The reaction system shown in the drawings is charged through valved inlet 10 with water until the vertical columns 1 and 2 are filled. The introduction of water is then discontinued. The ethylene-containing gas is introduced into column 1 through inlet 6 and porous thimble 7 at a rate sufficient to set up circulation of the water through column 1, header 3, column 2, and conduit 4 back into the bottom of column 1. Chlorine, which may be pure or mixed with inert diluents such as oxygen, nitrogen, etc., is at the same time passed into column 1 through inlet 8 and porous thimble 9 in equivalent volume to the inflowing ethylene. The liquor within the reaction system is maintained by suitable cooling at a temperature below its boiling point, which temperature is preferably below 80° C. and may be as low as 0° C. For most efficient reaction it is desirable that the liquor travel upward through column 1 at a rate considerably less than that at which the gas bubbles rise in said column. This is accomplished by means of gate 5 which retards the rate of liquid flow through the system. The inert gases, e. g. hydrogen and saturated hydrocarbons, separate from the liquor in header 3 and are vented from the system through outlet 12. As already mentioned, the height of columns 1 and 2 is so proportioned that sufficient time is allowed for completion of the reaction for formation of ethylene chlorohydrin during the time that the gas bubbles are rising therein to the surface of liquid in header 3. In practice the height will be varied according to the rate of circulation, temperature, and other factors, but in general the height should be in excess of 15 feet, and up to as much as 80 feet, or more.

Operation in the manner described is continued until samples of the reaction liquor upon analysis show that the desired chlorohydrin concentration (usually from 5 to 8 per cent chlorohydrin by weight) has been reached. Thereupon valve 11 is opened sufficiently to admit water to the system at a rate to maintain such concentration of chlorohydrin in the liquor. The latter then overflows continuously through outlet 13 into suitable receivers. During operation some ethylene chloride formed as by-product gradually accumulates in conduit 4, and is drawn off from time to time through drain 14.

The liquor flowing from the reaction system is an aqueous solution of ethylene chlorohydrin and hydrochloric acid. If desired, pure ethylene chlorohydrin, free from hydrochloric acid may be separated therefrom by known procedure, e. g. steam distillation or extraction with an organic solvent such as benzene, ethylene chloride, etc., followed by distillation of the extract. However, the crude ethylene chlorohydrin solution is, itself, a valuable product and may be employed directly as an agent in the manufacture of other chemicals.

The following example illustrates one way in which the principle of the invention has been employed, but is not to be construed as limiting the invention.

*Example*

Ethylene chlorohydrin was prepared in glass apparatus similar to that shown in Figure 1 of the annexed drawings. The vertical columns of the apparatus actually employed were each 16 feet 8 inches in height and of internal diameter 0.75 inch and the conduit corresponding to conduit 4 was likewise a glass tube of 0.75 inch internal diameter which was drawn at one point into a small orifice corresponding to gate 5 in Figure 1 of the drawings. The apparatus was filled with water, after which 20.9 gram moles of gaseous chlorine, intermixed with 15 per cent by volume of air, and a gas mixture of 20.9 gram moles of ethylene and an equal volume of hydrogen were introduced separately through inlets and porous thimbles corresponding to 6—7 and 8—9, respectively, of Figure 1. The rates of gas flow were controlled so that approximately 0.482 gram mole each of chlorine and ethylene was introduced per hour, the inert gases being vented from the top of the apparatus. The vent gas contained only 1.1 per cent by volume of ethylene, indicating that the reaction was substantially complete. At the end of 2.25 hours of operation, the reaction liquor contained acid in approximately 1.5 normal concentration. Thereafter water was introduced into the reaction system and liquor permitted to overflow therefrom at the rate necessary to maintain said concentration of acid in the liquor. After all of the gases had been introduced, all of the reaction liquor was combined and analyzed, a total of 11.96 kilograms of liquor being obtained. It contained 16.3 gram moles of ethylene chlorohydrin, 2.9 gram moles of ethylene chloride, and 0.2 gram mole of beta-beta'-dichloro-ethyl ether. Accordingly, the yields of ethylene chlorohydrin, ethylene chloride and dichloro-ethyl ether were approximately 78, 14 and 2 per cent of theoretical, respectively, the combined yield of said products being 94 per cent.

The apparatus and mode of operation hereinbefore specifically described provide for introducing the halogen and olefine into the same water column and venting gaseous diluents accompanying said reactants through a common outlet. Since the diluent which most commonly accompanies the halogen is air and the diluent accompanying the olefine is usually a mixture of hydrogen and saturated hydrocarbons, it obviously is desirable when using a very dilute halogen (e. g. a mixture of chlorine and air containing more than 15 per cent of the latter by volume) to avoid mixing of the same with the diluents accompanying the olefine, since the resultant mixture might explode if ignited. This may be accomplished without departure from the principle of the invention by carrying the reaction out in the apparatus illustrated by Figure 2.

Figure 2:
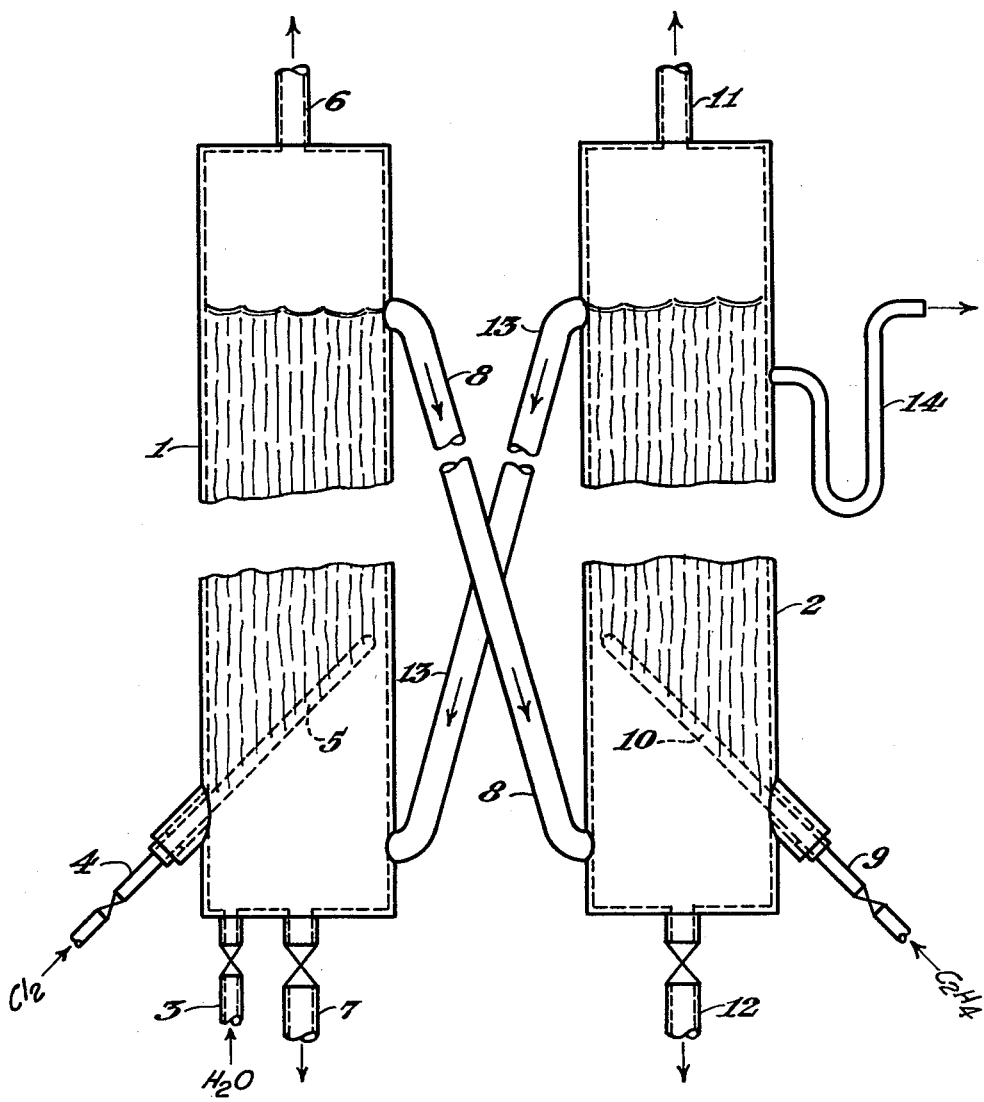

In Figure 2 the numerals 1 and 2 designate vertical columns communicating with one another through conduits 8 and 13 which lead from the upper portion of column 1 to the lower portion of column 2 and from the upper portion of column 2 to the lower portion of column 1, respectively. Columns 1 and 2 are provided near the bottom with gas inlets 4 and 9, respectively, which are fitted with porous thimbles 5 and 10 projecting into said columns and serving to disperse the gas as fine bubbles in liquid within the columns. The columns are further provided at the top with gas vents 6 and 11 and at the bottom with valved drains 7 and 12, respectively. In addition, column 1 is provided near the bottom with a valved water inlet 3 and column 2 is provided near its top with a trapped overflow outlet 14.

In producing ethylene chlorohydrin from water, a mixture of chlorine and air, and an ethylene-containing gas, e. g. pure ethylene or a mixture of ethylene, hydrogen, methane, ethane, etc., using the apparatus just described, columns 1 and 2 are first filled with water. The chlorine-containing gas is then introduced into column 1 via inlet 4 and thimble 5, and the ethylene-containing gas is introduced into column 2 via inlet 9 and thimble 10. The gaseous diluents are vented from the top of the columns into which they were introduced, i. e. air is vented from the top of column 1 and any hydrogen, methane, etc., introduced with the ethylene is vented from the top of column 2. The displacement of water by the gases causes an overflow of liquor from the top of each vertical column with resultant circulation of the same through conduits 8 and 13 into the bottom of the other column. Thus, the water circulates upwardly through column 1 wherein it is treated with chlorine to form an aqueous hypochlorous acid solution and the latter passes through conduit 8 into and upwardly through column 2 wherein it is treated with ethylene to form an ethylene chlorohydrin solution. The chlorohydrin solution flows from the top of column 2 through conduit 13 into column 1 wherein it is again treated with chlorine. Operation in such manner is continued until the reaction liquor contains ethylene chlorohydrin in the desired concentration, after which water is introduced through inlet 3 and liquor is permitted to overflow from the system through outlet 14 at the rate necessary to maintain such concentration of ethylene chlorohydrin in the liquor. The reaction is, of course, carried out at temperatures below 90° C. using the chlorine and ethylene in approximately equimolecular proportions.

In the two forms of apparatus shown in the drawings porous thimbles serve as means for introducing the gases into the liquor in finely dispersed bubbles. However, other means may be employed to secure a similar result of dispersing the gas bubbles throughout the liquid. For example, column 1 of the apparatus shown in Figure 1, or columns 1 and 2 of that shown in Figure 2, may be filled with packing material, such as pebbles, broken brick, Raschig rings, etc. In such case the packing serves both to break up the gas flow and also to retard the liquid flow, in the latter respect performing the function of gate 5 of the apparatus shown in Figure 1, which gate may then be omitted.

Although the foregoing description refers to the manufacture of ethylene chlorohydrin from ethylene, chlorine and water, other olefine halohydrins may be made by similar procedure. For instance, higher gaseous olefines may be reacted to form the corresponding chlorohydrins, or a mixture of the chlorohydrins of ethylene, propylene, butylene, etc., may be prepared by employing crude cracked-oil gas, containing said olefines, directly in the process. Also, bromine instead of chlorine may be used as the halogen reactant, in which case an olefine bromohydrin, e. g. ethylene bromohydrin, propylene bromohydrin, or butylene bromohydrin, etc., is formed.

As hereinbefore pointed out, the present invention possesses the particular advantage of providing a simple method and apparatus for the manufacture of olefine halohydrins wherein dilute and relatively inexpensive forms of olefines and halogen may be successfully employed as reactants. However, the invention is not limited to the employment of said reactants in dilute form, since either or both of the reactants may be used in concentrated or pure form without material change in the procedure or apparatus to be employed. For instance, pure propylene and chlorine may be employed in the process to produce propylene chlorohydrin; a pure butylene and bromine may be used to produce the corresponding butylene bromohydrin; etc.

In manufacturing ethylene chlorohydrin according to the invention, the water and reaction gases are preferably introduced into the reaction system and liquor is withdrawn from said system at the rates necessary to maintain a concentration of ethylene chlorohydrin not greatly exceeding 8 per cent by weight in the reaction liquor. However, the reactants may, if desired, be introduced at rates such as to form a higher concentration of ethylene chlorohydrin in the liquor, in which case dichloroethyl ether is also formed as a valuable product, as indicated in the co-pending application of H. S. Nutting et al., Serial No. 710,312, filed February 8, 1934. The yield thereof becomes higher as the concentration of ethylene chlorohydrin in the reaction liquor is increased. When another olefine, e. g. propylene, or another halogen, e. g. bromine, is employed as a reactant under such conditions the corresponding dihalo-alkyl ether, e. g. beta-beta'-dibromo-propyl ether, is formed. Accordingly, the invention also provides an efficient method and apparatus for the manufacture of a dihalo-alkyl ether directly from water, a halogen, and an olefine, wherein the halogen and olefine may be employed in dilute or concentrated forms, as desired. The reaction for the formation of a dihalo-alkyl ether may be promoted by dissolving an inorganic salt such as a chloride or sulphate of sodium, potassium, calcium, copper, magnesium, etc. in the reaction liquor.

The method and apparatus herein disclosed are adapted to the production of olefine chlorohydrins, olefine bromohydrins, dichloro-alkyl ethers, and dibromo-alkyl ethers, but not to the production of corresponding fluorine or iodine compounds. Accordingly, the halogens referred to in the specification and claims are chlorine and bromine. The water referred to in the following method claims may contain products of the reactions herein dealt with, e. g. an olefine halohydrin, a hydrohalic acid, etc.

Other modes of applying the principle of the invention may be employed instead of those explained, change being made as regards the method or mechanism herein disclosed, provided the steps or means stated by any of the following claims or the equivalent of such stated steps or means be employed.

We therefore particularly point out and distinctly claim as our invention:—

1. In a method of making olefine halohydrins and dihalo-alkyl ethers, the steps which consist in introducing a halogen and a gaseous olefine separately and in approximately equimolecular proportions near the bottom of a vertical column of water, dispersing the halogen and olefine in the water, permitting liquid displaced by the gases to overflow from the top of the column and returning the same to the bottom of the column, the circulation of liquid being caused by the gases displacing liquid from said vertical column.

2. In a method of making olefine halohydrins and dihalo-alkyl ethers, the steps which consist in introducing chlorine and a gaseous olefine separately in approximately equimolecular proportions near the bottom of a vertical column of water of sufficient height to permit substantially complete reaction during passage of the gases upwardly therethrough, dispersing the gases as small bubbles in the liquid, permitting liquid displaced by the gases to overflow from the top of the column and returning the same to the bottom of the column, continuously withdrawing a portion of the liquid from the system, and adding sufficient water to maintain a substantially constant volume of liquid in the system, the mixture during reaction being maintained at a temperature below 90° C.

3. In a method of making olefine halohydrins and dihalo-alkyl ethers, the steps which consist in introducing chlorine and olefine which is diluted with gases inert to the reaction separately and in approximately equimolecular proportions near the bottom of a vertical column of water of sufficient height to permit substantially complete reaction during passage of the gases upwardly therethrough, dispersing the gases as small bubbles in the liquid, permitting liquid displaced by the gases to overflow from the top of the column and returning the same to the bottom of the column, venting inert gases from the top of the column, continuously withdrawing a portion of the liquor from the system and adding sufficient water to maintain a substantially constant volume of liquor in the system, the reacting mixture being maintained at a temperature not exceeding 80° C.

4. In a method of making olefine halohydrins and dihalo-alkyl ethers, the steps which consist in introducing a vapor mixture of a halogen and a diluent gas near the bottom of a vertical column of water, dispersing the gas mixture in the liquid, venting the gaseous diluent from the top of the column, permitting liquid displaced by the gas to overflow from the top of the column and pass into the bottom of a second vertical column of water, introducing an olefine containing gas near the bottom of said second column and dispersing the gas in the liquid, and permitting liquid displaced by the gas to overflow from the top of said second column and pass into the bottom of the first column.

5. In a method of making olefine halohydrins and dihalo-alkyl ethers, the steps which consist in introducing a gaseous mixture of a halogen and air near the bottom of a vertical column of water, dispersing the gas in the liquid, venting air from the top of the column, permitting liquid displaced by the gas to overflow from the top of the column and pass into the bottom of a second vertical column of water, introducing an olefine-containing gas near the bottom of said second column and dispersing the gas in the liquid, permitting liquid displaced by the gas to overflow from the top of said second column and pass into the bottom of the first column, continuously withdrawing a portion of the liquid from the system and adding sufficient water to maintain a substantially constant volume of liquid therein, the reaction mixture being maintained at a temperature below 90° C.

6. In a method for the manufacture of an olefine chlorohydrin, the steps which consist in introducing a gaseous mixture of chlorine and air near the bottom of a vertical column of water, dispersing the gas in the liquid, venting air from the top of the column, permitting liquid displaced by the gas to overflow from the top of the column and pass into the bottom of a second vertical column of water, introducing a gas comprising an olefine, hydrogen, and saturated hydrocarbons near the bottom of said second column and dispersing the gas in the liquid, venting hydrogen and saturated hydrocarbon gases from the top of said second column, permitting liquid displaced by the gas to overflow from the top of the second column and pass into the bottom of the first column, continuously withdrawing a portion of the liquid from the system and adding sufficient water to maintain a substantially constant volume of liquid in the system, the reaction liquor being maintained at a temperature below 90° C. and the chlorine and olefine being employed in approximately equimolecular proportions.

7. In a method for the manufacture of an olefine halohydrin, the steps which consist in introducing a halogen and a gaseous olefine separately and in approximately equimolecular proportions near the bottom of a vertical column of water of sufficient height to permit substantially complete reaction during passage of the gases upwardly therethrough, dispersing the gases as small bubbles in the liquid, permitting liquid displaced by the gases to overflow from the top of the column and returning the same to the bottom of the column, the mixture being maintained at a temperature not exceeding 90° C. during reaction.

8. In a method for the manufacture of an olefine chlorohydrin, the steps which consist in introducing chlorine and a gaseous olefine separately and in approximately equimolecular proportions near the bottom of a vertical column of water of sufficient height to permit substantially complete reaction during passage of the gases upwardly therethrough, dispersing the gases as small bubbles in the liquid, permitting liquid displaced by the gases to overflow from the top of the column and returning the same to the bottom of the column, continuously withdrawing a portion of the liquor from the reaction system and adding sufficient water to maintain a substantially constant volume of liquid in the system, the mixture during reaction being maintained at a temperature not exceeding 80° C. and the liquid reaction mixture being withdrawn from the system and replaced by water at a rate sufficient to maintain the concentration of olefine chlorohydrin in the solution below about 8 per cent by weight.

9. In a method of making ethylene chlorohydrin, the steps which consist in introducing chlorine and ethylene, admixed with hydrogen and saturated hydrocarbon gases, separately and in approximately equimolecular proportions near the bottom of a vertical column of an aqueous ethylene chlorohydrin solution of concentration between 5 and 8 per cent by weight, said column being of sufficient height to permit substantially complete reaction during passage of the gases upwardly therethrough, dispersing the gases as small bubbles in the liquid, permitting liquid displaced by the gases to overflow from the top of the column and returning the same to the bottom of the column, and continuously withdrawing a portion of the reaction liquor and adding an equal volume of water at a rate sufficient to maintain the above-stated concentration of ethylene chlorohydrin in the liquor, the mixture during reaction being maintained at a temperature not exceeding 80° C.

10. In a method of making propylene chlorohydrin, the steps which consist in introducing chlorine and propylene separately and in approximately equimolecular proportions near the bottom of a vertical column of water of sufficient height to permit substantially complete reaction during passage of the gases upwardly therethrough, dispersing the gases in the liquid, permitting liquid displaced by the gases to overflow from the top of the column and returning the same to the bottom of the column, continuously withdrawing a portion of the reaction liquor and adding sufficient water to maintain a substantially constant volume of liquid in the reaction system, the mixture during reaction being maintained at a temperature below 90° C.

11. In a method of making a butylene chlorohydrin, the steps which consist in introducing chlorine and a butylene separately and in approximately equimolecular proportions near the bottom of a vertical column of water for sufficient height to permit substantially complete reaction during passage of the gases upwardly therethrough, dispersing the gases in the liquid, permitting liquid displaced by the gases to overflow from the top of the column and returning the same to the bottom of the colulmn, continuously withdrawing a portion of the reaction liquor and adding sufficient water to maintain a substantially constant volume of liquid in the reaction system, the mixture during reaction being maintained at a temperature below 90° C.

EDGAR C. BRITTON
HOWARD S. NUTTING.
MYRON E. HUSCHER.